United States Patent
Husband et al.

(10) Patent No.: US 8,508,095 B2
(45) Date of Patent: Aug. 13, 2013

(54) FLUX-SWITCHING MACHINE

(75) Inventors: Stephen Mark Husband, Oakwood (GB); David James Powell, Carterknowle (GB); Zi-Qiang Zhu, Sheffield (GB); Geraint Wyn Jewell, Owlthorpe (GB); Arwyn Thomas, Sheffield (GB)

(73) Assignee: Rolls-Royce PLC (GB)

( * ) Notice: Subject to any disclaimer, the term of this patent is extended or adjusted under 35 U.S.C. 154(b) by 293 days.

(21) Appl. No.: 12/241,677

(22) Filed: Sep. 30, 2008

(65) Prior Publication Data

US 2009/0091198 A1    Apr. 9, 2009

(30) Foreign Application Priority Data

Oct. 5, 2007   (GB) .................................. 0719814.6

(51) Int. Cl.
*H02K 21/14*    (2006.01)
*H02K 21/16*    (2006.01)
*H02K 21/18*    (2006.01)
*H02K 21/20*    (2006.01)
*H02K 1/06*    (2006.01)

(52) U.S. Cl.
USPC ............... 310/181; 310/12.24; 310/154.02; 310/216.008; 310/216.023; 310/216.036; 310/216.074; 310/216.093

(58) Field of Classification Search
USPC ........ 310/12.24, 154, 181, 216.008, 216.022, 310/216.023, 216.024, 216.36, 216.39, 216.088, 310/21.091, 216.093

IPC ............... H02K 1/00,3/00, 19/26, 21/00, 23/02, H02K 21/14, 21/16, 21/18, 21/20, 1/06
See application file for complete search history.

(56) References Cited

U.S. PATENT DOCUMENTS

| | | | | | |
|---|---|---|---|---|---|
| 2,864,018 | A | * | 12/1958 | Aeschmann ................... | 310/163 |
| 2,917,699 | A | * | 12/1959 | Grant .............................. | 322/58 |
| 3,439,200 | A | * | 4/1969 | Saito et al. .................. | 310/49.45 |
| 4,335,338 | A | * | 6/1982 | Sawyer .......................... | 318/135 |
| 5,602,431 | A | * | 2/1997 | Satomi et al. .................... | 310/14 |
| 5,693,989 | A | * | 12/1997 | Satomi et al. ............... | 310/12.17 |
| 6,087,742 | A | * | 7/2000 | Maestre ...................... | 310/12.24 |
| 6,242,834 | B1 | * | 6/2001 | Akemakou ................... | 310/162 |
| 6,342,746 | B1 | * | 1/2002 | Flynn ........................... | 310/181 |
| 6,563,244 | B1 | * | 5/2003 | Yamauchi et al. ........... | 310/90.5 |

(Continued)

FOREIGN PATENT DOCUMENTS

| | | |
|---|---|---|
| CN | 1848608 A | 10/2006 |
| GB | 2428903 A | 2/2007 |

(Continued)

OTHER PUBLICATIONS

Ban, JP 03195349 A, English abstract, Aug. 1991.*

(Continued)

*Primary Examiner* — John K Kim
(74) *Attorney, Agent, or Firm* — McCormick, Paulding & Huber LLP

(57) ABSTRACT

A flux-switching machine stator comprising two or more C-cores, each C-core having two legs and a back portion joining the legs, and a permanent magnet arranged between legs of adjacent C-cores. Each leg has a main portion and a tip portion further from the back portion characterized in that the tip portion of each leg is angled relative to the main portion of the respective leg.

18 Claims, 5 Drawing Sheets

(56) References Cited

U.S. PATENT DOCUMENTS

| | | | |
|---|---|---|---|
| 6,933,818 B2 * | 8/2005 | Kaneshige | 335/272 |
| 7,898,135 B2 * | 3/2011 | Flynn | 310/152 |
| 2005/0126171 A1 * | 6/2005 | Lasker | 60/645 |
| 2006/0055274 A1 * | 3/2006 | Kim | 310/216 |
| 2006/0101804 A1 * | 5/2006 | Stretton | 60/226.1 |
| 2007/0029890 A1 * | 2/2007 | Deodhar et al. | 310/216 |
| 2007/0222304 A1 * | 9/2007 | Jajtic et al. | 310/12 |
| 2008/0185932 A1 * | 8/2008 | Jajtic et al. | 310/181 |
| 2009/0091198 A1 * | 4/2009 | Husband et al. | 310/46 |

FOREIGN PATENT DOCUMENTS

| | | |
|---|---|---|
| JP | 03195349 A * | 8/1991 |
| WO | 2005/064767 A1 | 7/2005 |
| WO | 2007/144232 A1 | 12/2007 |

OTHER PUBLICATIONS

Ban (JP 3-195349), English translation, Aug. 1991.*

* cited by examiner

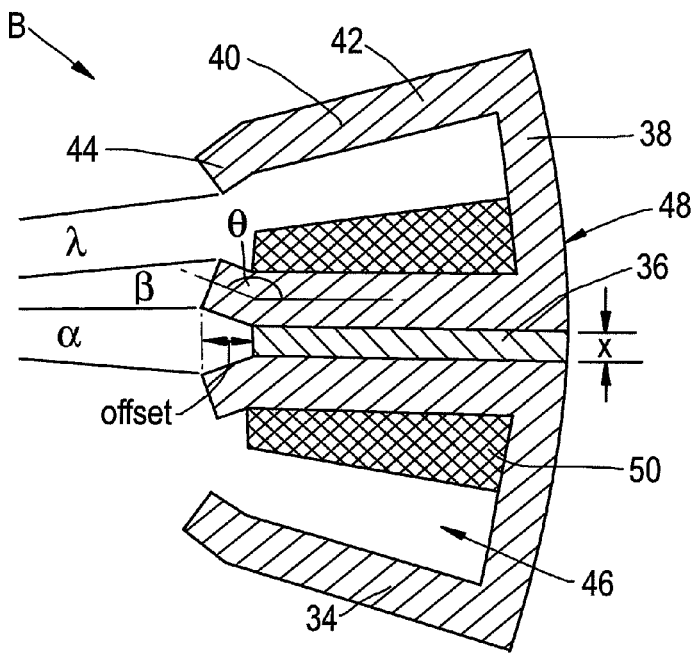
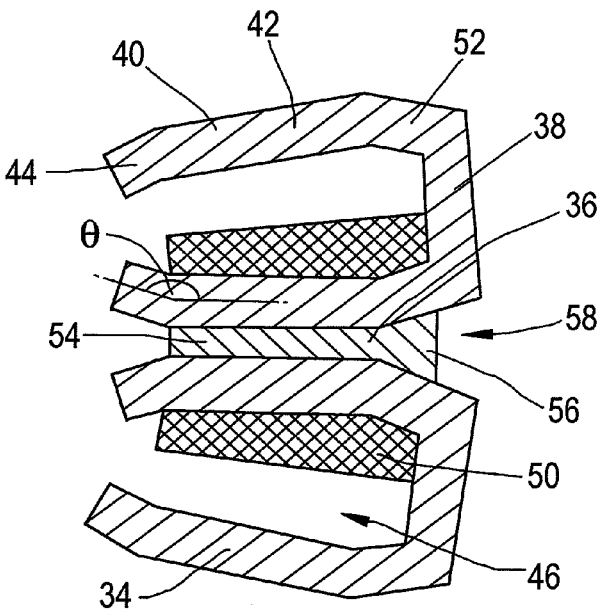

FLUX-SWITCHING MACHINE

CROSS REFERENCE TO RELATED APPLICATION

This application is entitled to the benefit of British Patent Application No. GB 0719814.6, filed on Oct. 5, 2007.

FIELD OF INVENTION

The present invention relates to flux-switching machines.

BACKGROUND OF THE INVENTION

Flux-switching machines have been identified as a possible option for aerospace primary power generation as they offer high torque capability and good efficiency. Flux-switching machines are similar to switched reluctance machines, which make them more suitable to high-speed operation than a surface mount permanent magnet machine.

A typical example of a flux-switching machine is shown in FIG. 1. It has a simply constructed, annular single-piece rotor 10 having a plurality of annularly arrayed rotor teeth 12 on its radially outer surface. Coaxial with and radially outside the rotor 10 is an annular stator 14, which comprises an annular array of alternate C-cores 16 and permanent magnets 18. The permanent magnets 18 are placed circumferentially between adjacent stator C-cores 16 and concentrated windings 20 are wound in a conventional manner around each tooth 22, where a tooth 22 comprises a permanent magnet 18 and the nearer leg of each of the two adjacent C-cores 16. The machine can be wound for conventional sinusoidal three-phase operation. There is a slot area 24 between the legs of each C-core 16.

As shown in the enlargement of FIG. 2, typically the angle $\beta$ made by the thickness of each C-core 16 leg, the permanent magnet 18 pole-pitch $\alpha$ and the slot pitch $\lambda$ of the slot area 24 are equal. This maximises the torque generated for a given size of machine. Typically, each of these angles is the same as the angle made by each rotor tooth 12.

One disadvantage of this type of flux-switching machine is that there is a smaller slot area 24 available than in equivalently sized conventional permanent magnet machines having surface mount magnets on the rotor. This means there is a relatively high current density in the windings 20, particularly in larger machines with high electric loading, which can increase the temperature of those windings 20 and consequently reduce the life of the machine and its component parts.

The present invention seeks to provide a flux-switching machine that seeks to address the aforementioned problem.

SUMMARY OF THE INVENTION

Accordingly, the present invention provides a flux-switching machine stator including two or more C-cores, each C-core having two legs and a back portion joining the legs, each leg having a main portion and a tip portion further from the back portion, the stator further including a permanent magnet arranged between legs of adjacent C-cores; characterised in that each leg has a constant width and in that the tip portion of each leg is angled relative to the main portion of the respective leg.

Preferably, the C-cores are arranged in a circumferential array. More preferably, the legs of each C-core extend generally radially. Alternatively, the main portions of the legs may be generally parallel.

Preferably, the tip portion of at least one of the legs of each C-core is angled away from the adjacent permanent magnet. The tip portion of at least one of the legs of each C-core may be angled towards the adjacent permanent magnet.

Preferably, the tips portions of adjacent legs are angled in the same circumferential direction. Alternatively, the tip portions of adjacent legs are angled in different circumferential directions. More preferably, the tip portions of each C-core are angled towards each other. Alternatively, the tip portion of a first leg of each C-core is angled towards a second leg of the respective C-core and the tip portion of the second leg of each C-core is angled away from the first leg of the respective C-core.

Preferably, the tip portion is angled by at least 135° relative to the main portion.

Preferably, the thickness of each leg and the distance between each adjacent pair of legs subtend substantially equal angles to maximise torque production.

Preferably, the permanent magnet is parallel sided for at least some of its radial length. Alternatively or additionally, the permanent magnet may be trapezoidal in cross-section for at least some of its radial length.

Aspects of the present invention also provide a flux-switching machine comprising a rotor and a stator as described in any of the preceding seven paragraphs. The present invention further provides a gas turbine engine incorporating such a flux-switching machine.

BRIEF DESCRIPTION OF THE DRAWINGS

FIG. 4 is an enlargement of the area B of FIG. 3.

FIG. 5-FIG. 7 are similar to FIG. 4 and show different embodiments of the present invention.

DETAILED DESCRIPTION OF THE PREFERRED EMBODIMENTS

Figure 1:
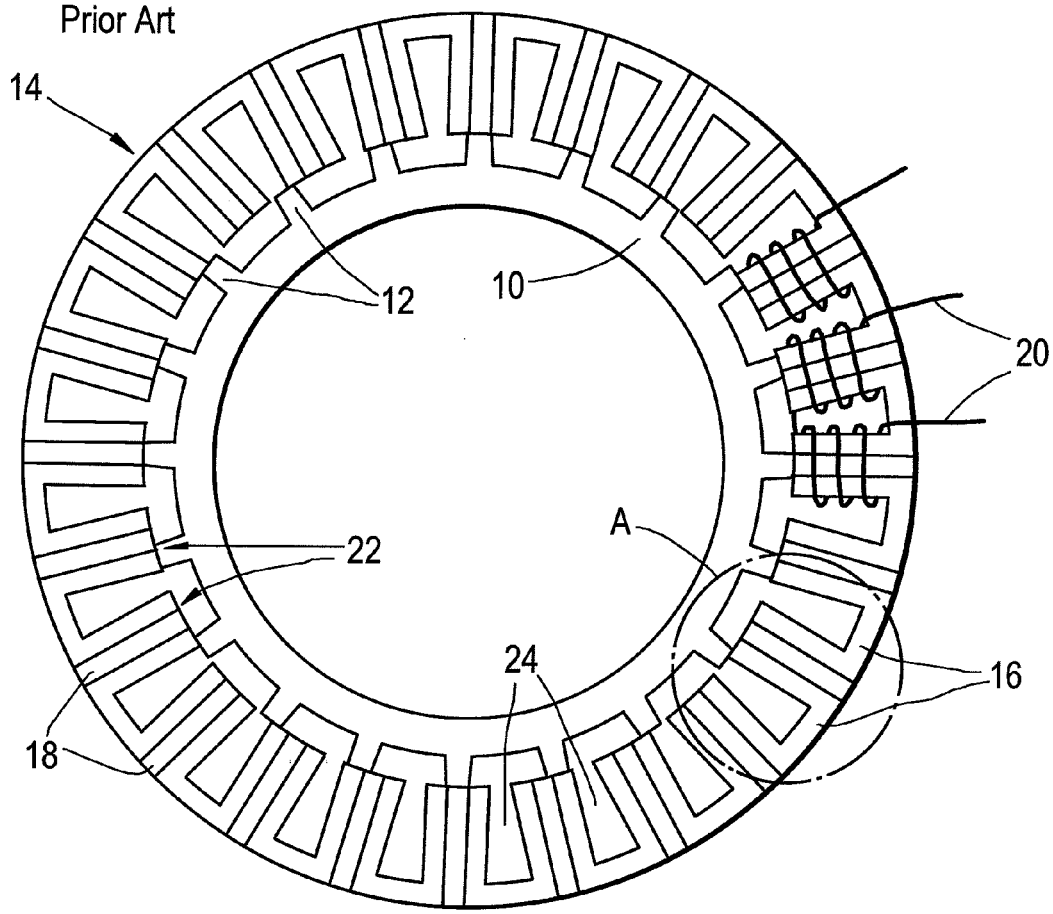
FIG. 1 is a schematic view of a flux-switching machine according to the prior art.
Figure 2:
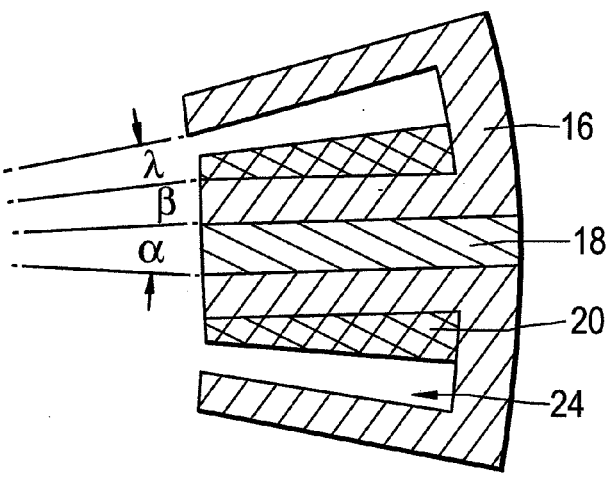
FIG. 2 is an enlargement of the area A of FIG. 1.
Figure 3:
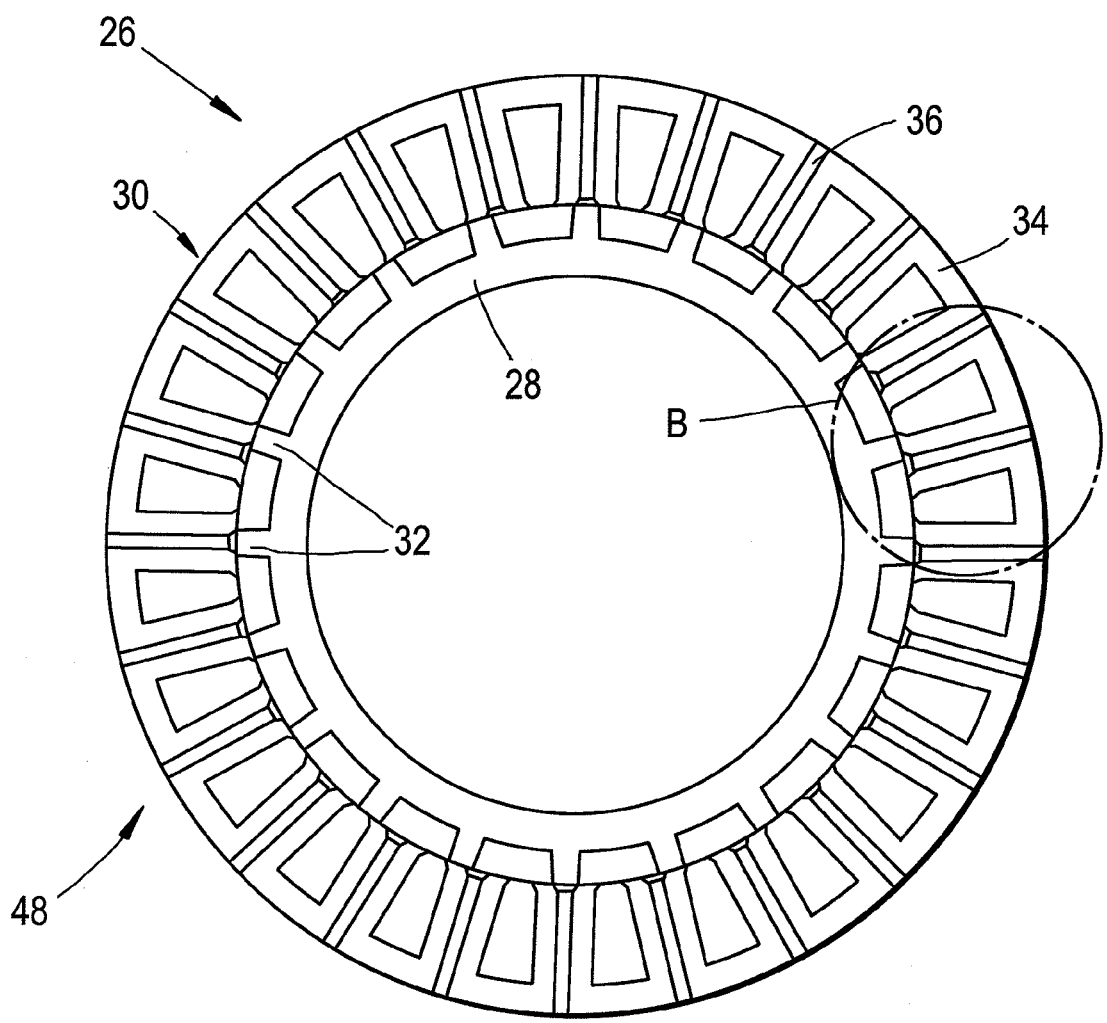
FIG. 3 is a schematic view of a flux-switching machine according to the present invention.

A flux-switching machine 26 according to the present invention is shown in FIG. 3, and comprises a coaxial rotor 28 and stator 30. The rotor 28 is similar to the prior art rotor 10 shown in FIG. 1, and includes an annular array of rotor teeth 32 extending radially outwardly from the rotor 28 towards the stator 30. There are twenty rotor teeth 32 shown in FIG. 3 but this number can be varied as required for different applications. The stator 30 comprises an annular array of alternate C-cores 34 and permanent magnets 36. There are twenty-four pairs of C-cores 34 and permanent magnets 36 shown in FIG. 3 but this number can be varied as required for different applications. For operation of the flux-switching machine 26, there should always be a different number of rotor teeth 32 and stator C-cores 34 and permanent magnets 36. Usually, there will be more stator C-core 34 and permanent magnet 36 pairs than rotor teeth 32.

As can be seen more clearly in the enlargement of FIG. 4, each C-core 34 comprises a back portion 38 with a leg 40 extending radially inwardly from each circumferential end of the back portion 38. The back portion 38 is curved so that the complete annular array of alternate C-cores 34 and permanent magnets 36 form a substantially continuous annulus. Each leg 40 comprises a main portion 42 that is adjacent to the back portion 38, and a tip portion 44 that is distant therefrom. The tip portion 44 is angled relative to the main portion 42 at an obtuse tip angle θ. Between the legs 40 of each C-core 34 is a slot area 46. The legs 40 converge on, or taper towards, the center line of symmetry of the C-core 34 so that the back portion 38 is circumferentially wider than the position between the main portion 42 and the tip portion 44.

The permanent magnet 36 is parallel-sided and is located between an adjacent pair of C-cores 34. The permanent magnet 36 has a reduced thickness x in comparison to the prior art permanent magnet 18 (FIG. 1) due to the combination of high working flux density and relatively small variation in magnet working point. The permanent magnet 36 also has reduced radial length compared to the prior art so that it is adjacent to the main portions 42 of the legs 40 of the adjacent C-cores 34, but does not extend radially inwardly in the region adjacent to the tip portions 44 of the legs 40 of the C-cores 34. A gap between the radially inner ends of the permanent magnets 36 and the ends of the tip portions 44 of the legs 40 is labelled 'offset' in FIG. 4.

Each permanent magnet 36 and the legs 40 on either side of it form a stator tooth 48. Around each tooth 48 is a concentrated winding 50 wound in conventional manner. The flux-switching machine 26 may be wound for conventional sinusoidal three-phase operation. Typically, each winding 50 is wound to contact around the main portions 42 of the legs 40 and not around the tip portions 44.

FIG. 4 shows the tip angle θ arranged so that the tip portions 44 of the two legs 40 of a single C-core 34 are closer together than their respective main portions 42. Preferably, θ is at least 135° to prevent excessive flux leakage in the stator 30.

The reduction in the thickness x of the permanent magnets 36, and the angling of the tip portions 44 of the legs 40 of the C-core 34 results in the slot pitch λ, leg thickness β and the gap perpendicular to the offset α subtending equal angles. This means that the machine 26 is capable of maximizing torque generation whilst providing a larger slot area 46. This has the advantage of reducing the current density of the windings 50 and/or providing space for better insulation of the wires that are wound to form the windings 50. Furthermore, the slot area 46 may be filled with copper to reduce the operating temperature and thereby increase the life of the flux-switching machine 26.

The increased slot area 46 provides a more power and weight dense machine 26 for the same external dimensions. Alternatively, the outer diameter of the stator 30 may be reduced for a constant rotor 28 diameter providing a lighter and more compact machine 26. This may be particularly advantageous in the weight- and size-critical environment of aerospace primary power generation. A typical flux-switching machine for use in aerospace primary power generation, according to the present invention, may be approximately 320 mm in diameter, 80 mm in axial length and have a rated power output of 430 kW. However, machines having other sizes and power ratings are also possible within the scope of the present invention.

A second embodiment of the flux-switching machine 26 of the present invention is shown in FIG. 5. Two adjacent C-cores 34 are shown with a permanent magnet 36 of reduced thickness therebetween. The C-cores 34 comprise, as in the first embodiment, a back portion 38 and two legs 40 extending radially inwardly from each circumferential end of the back portion 38. Each leg 40 is, however, formed of three constituent parts: a tip portion 44, a main portion 42, and an additional proximal portion 52 that extends between the main portion 42 and the back portion 38. The proximal portion 52 is angled so that it diverges from the center line of symmetry of the C-core 34 between the back portion 38 and the main portion 42. The back portion 38 is correspondingly shorter in the circumferential direction and is typically straight rather than curved. Hence, the widest part of the C-core 34 of the second embodiment, in the circumferential sense, is at the join between the proximal portion 52 and the main portion 42. The main portion 42 converges on the center line of symmetry of the C-core 34 between the proximal portion 52 and the tip portion 44. The tip portion 44 is angled to converge, as in the first embodiment, at a more pronounced angle.

The permanent magnet 36 is also altered in the second embodiment shown in FIG. 5. The main section 54 is reduced in the radial direction in comparison with the first embodiment so that the main section is the same radial length as the main portion 42 of the legs 40 of the C-cores 34. The main section 54 is parallel-sided. Radially outwardly of the main section 54 is an outer section 56 that is trapezoidal in cross-section so that its edges abut the angled proximal portions 52 of the adjacent C-cores 34. The outer section 56 is radially shorter than the adjacent proximal portions 52 and there is therefore a trapezoidal void 58 between the radially outer edge of the outer section 56 and the chord between the outer edges of the back portions 38 of the adjacent C-cores 34. This arrangement acts to decrease the magnetic flux leakage path between the C-cores 34. The trapezoidal void 58 is suitable for forced cooling to be applied, directly or within a duct in this region.

The shape of the permanent magnet 36 of this second embodiment prevents it from moving radially inwardly towards the rotor 28 of the flux-switching machine 26. It may also provide secondary mechanical support to the permanent magnet 36.

Figure 6:
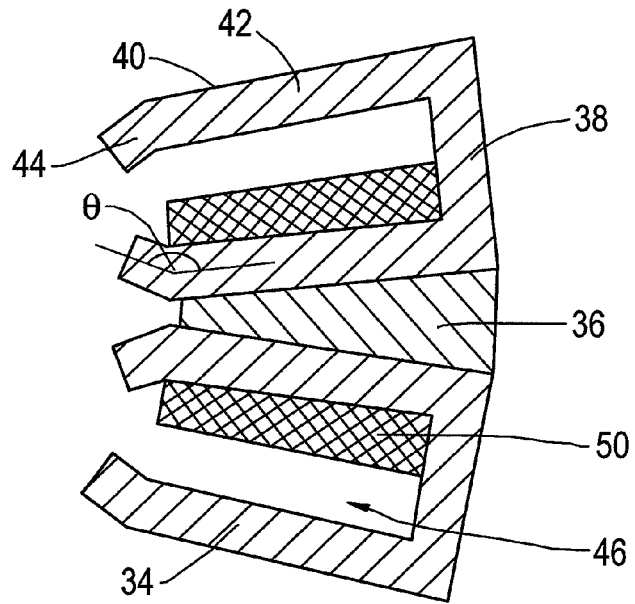

A third embodiment of the flux-switching machine 26 of the present invention is shown in FIG. 6. In this embodiment the C-core 34 comprises a back portion 38 and legs 40 each having a main portion 42 and a tip portion 44. There is no proximal portion. The back portion 38 is straight and is circumferentially shorter than the equivalent portion in the first embodiment shown in FIG. 4. This means that the legs 40 are substantially parallel or have a slight convergence toward the center line of symmetry of the C-core 34 and hence the slot area 46 is substantially rectangular in cross-section. This is beneficial because there is a larger surface area in contact with the C-core 34, and because the center of the winding is closer to the edge of it and thus there is a reduced temperature differential and corresponding maximum winding temperature. The tip portions 44 are angled as in the previous embodiments.

The permanent magnet 36 of this embodiment is trapezoidal so that its edges abut the edges of the main portion 42 of the adjacent C-cores 34. This provides secondary mechanical support to the permanent magnet 36 and prevents it from moving towards the rotor 28 of the flux-switching machine 26. The permanent magnet 36 extends the full radial length of the main portion 42 of the C-core 34 so that its inner extent is adjacent to the joins between the main portions 42 and the tip portions 44 whilst its outer extent forms a chord between the edges of the back portions 38 of the adjacent C-cores 34.

Figure 7:
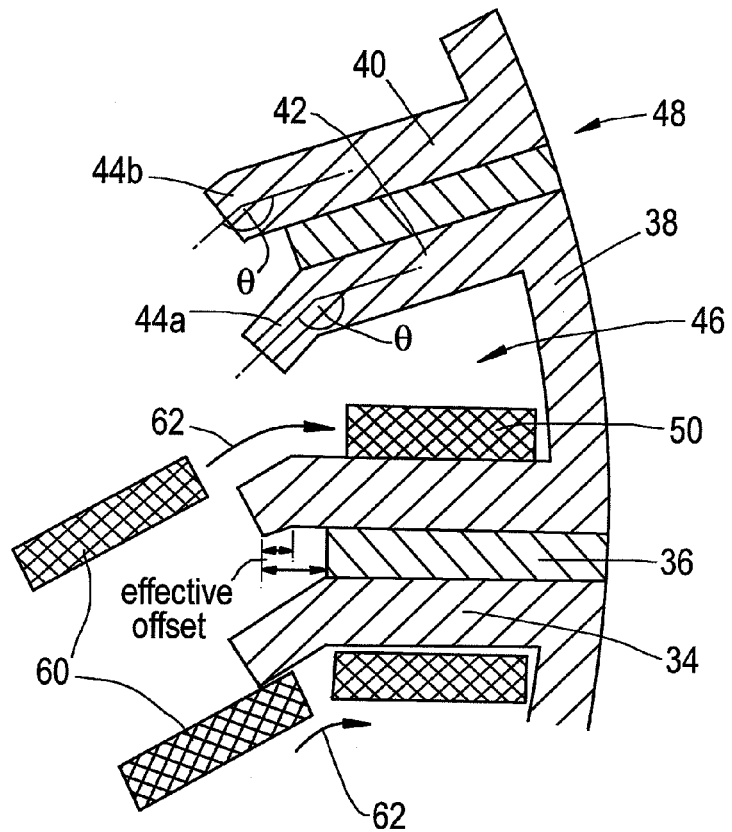

A fourth embodiment of the present invention is shown in FIG. 7. The permanent magnet 36 is substantially identical to that described in relation to the first embodiment, shown in FIG. 4. The C-core 34 has the same basic shape as the first embodiment, having a curved back portion 38 and legs 40 defining a slot area 46 therebetween. Each leg 40 comprises a main portion 42 and a tip portion 44. However, the tip portions 44 differ from those described in previous embodiments. Both the tip portions 44 of a single C-core 34 are angled at the same tip angle θ, but both tip portions 44 are angled in the same circumferential direction, rather than being angled to converge on the center line of symmetry of the C-core 34. In order to maintain the equality of angles required to offer maximum torque generation, a first tip portion 44*a* has a greater effective offset than a second tip portion 44*b*.

This arrangement is amenable to pre-wound coils. Such a pre-wound coil 60 may be slipped over a stator tooth 48 as shown by arrows 62. This may improve the speed of assembly of a flux-switching machine 26 according to the present invention since the windings 50 may be formed separately whilst the machine 26 is assembled, and then the pre-wound coils 60 may be slipped over each stator tooth 48.

Figure 8:
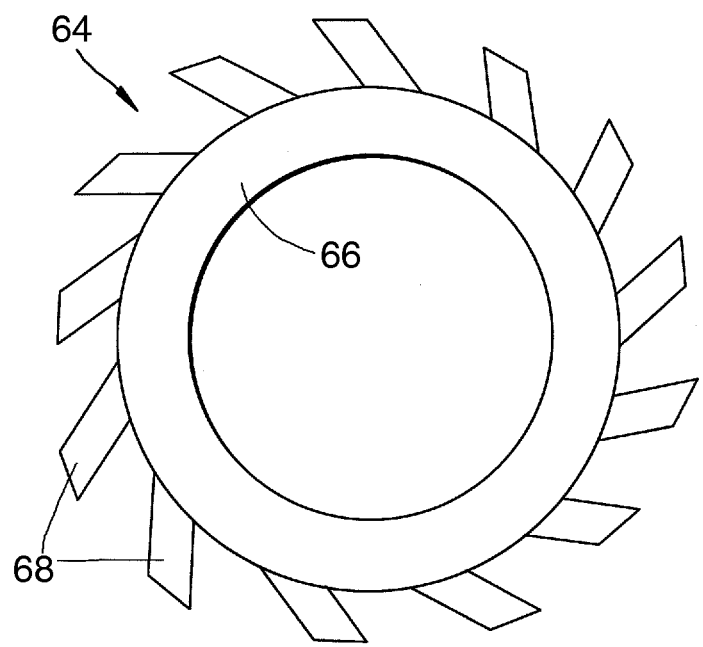
FIG. 8 is a schematic view of a rotor for use with the stator embodiment of FIG. 7.

The fourth embodiment of the present invention, shown in FIG. 7, is particularly amenable to use with the skewed rotor arrangement shown in FIG. 8. The skewed rotor 64 comprises a rotor hub 66 with an annular array of rotor teeth 68 on its radially outer surface. The teeth 68 are skewed so that they extend radially outwardly with a tangential component so that, with clockwise rotation of the rotor 64, the radially inner part of a tooth 68 passes a given stationary point before the radially outer part of the same tooth 68. This provides scope for modifying the inductance variation on entry and exit and exploits the uni-directional rotation of some applications of the present invention.

Figure 9:
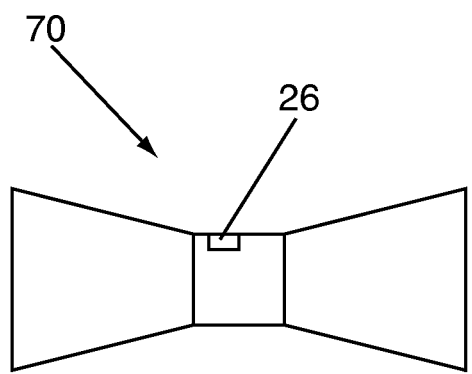
FIG. 9 is a schematic view of a gas turbine engine including a flux-switching machine according to the present invention.

In some applications of the present invention, the inventive flux-switching machine 26 may be assembled into a gas turbine engine 70 as shown in FIG. 9.

Although the present invention has been described with annular embodiments, it is also possible to employ the principles of the present invention in a linear electrical machine.

What is claimed is:

1. A permanent magnet flux-switching machine stator comprising:
    two or more C-cores, each C-core having two legs and a back portion joining the legs, each leg having a main portion and a tip portion, the tip portion being located further from the back portion than is the main portion, each leg including the main portion and the tip portion having a same constant width extending in a plane normal to an axial direction of the stator, and the tip portion of each leg angled relative to the main portion of the respective leg, and
    a permanent magnet arranged between legs of adjacent ones of the two or more C-cores.

2. A permanent magnet flux-switching machine stator as claimed in claim 1 wherein the C-cores are arranged in a circumferential array.

3. A permanent magnet flux-switching machine stator as claimed in claim 2 wherein the legs of each C-core extend generally radially.

4. A permanent magnet flux-switching machine stator as claimed in claim 3 wherein the main portions of the legs of each C-core are generally parallel.

5. A permanent magnet flux-switching machine stator as claimed in claim 1 wherein the tip portion of at least one of the legs of each C-core is angled away from the adjacent permanent magnet.

6. A permanent magnet flux-switching machine stator as claimed in claim 1 wherein the tip portion of at least one of the legs of each C-core is angled towards the adjacent permanent magnet.

7. A permanent magnet flux-switching machine stator as claimed in claim 1 wherein the tip portions of adjacent legs are angled in the same circumferential direction.

8. A permanent magnet flux-switching machine stator as claimed in claim 1 wherein the tip portions of adjacent legs are angled in different circumferential directions.

9. A permanent magnet flux-switching machine stator as claimed in claim 1 wherein the tip portions of each C-core are angled towards each other.

10. A permanent magnet flux-switching machine stator as claimed in claim 1 wherein the tip portion of a first leg of each C-core is angled towards a second leg of the respective C-core and the tip portion of the second leg of each C-core is angled away from the first leg of the respective C-core.

11. A permanent magnet flux-switching machine stator as claimed in claim 1 wherein the tip portion is angled by at least 135° relative to the main portion.

12. A permanent magnet flux-switching machine stator as claimed in claim 1 wherein the legs of each C-core extend generally radially inwardly from the respective back portion toward a common center, and the thickness of each leg and the distance between each adjacent pair of legs subtend substantially equal angles from the common center to maximise torque production.

13. A permanent magnet flux-switching machine stator as claimed in claim 1 wherein the permanent magnet is parallel sided for at least some of its radial length.

14. A permanent magnet flux-switching machine stator as claimed in claim 1 wherein the permanent magnet is trapezoidal in cross-section for at least some of its radial length.

15. A permanent magnet flux-switching machine comprising a rotor and a stator, said stator having:
    two or more C-cores, each having two legs and a back portion joining the legs, each leg having a main portion and a tip portion being located further from the back portion than is the main portion, each leg including the main portion and the tip portion having a same constant width extending in a plane normal to an axial direction of the stator, and the tip portion of each leg angled relative to the main portion of the respective leg, and
    a permanent magnet arranged between legs of adjacent C-cores; and
    said rotor having a number of poles related to the number of C-cores in said stator, such that flux reverses in the poles of said rotor during its rotation.

16. A gas turbine engine comprising:
    a permanent magnet flux-switching machine having:
    two or more C-cores, each having two legs and a back portion joining the legs, each leg having a main portion and a tip portion being located further from the back portion than is the main portion, each leg including the main portion and the tip portion having a same constant width extending in a plane normal to an axial direction of the stator, and the tip portion of each leg angled relative to the main portion of the respective leg, and
    a permanent magnet arranged between legs of adjacent C-cores.

17. A permanent magnet flux-switching machine stator comprising:
    two or more C-cores, each C-core having two legs and a back portion joining the legs, each leg having a main portion and a tip portion being located further from the back portion than is the main portion, each leg including the main portion and the tip portion of a same constant width extending in a plane normal to an axial direction of the stator, and the tip portion of each leg angled relative to the main portion of the respective leg;

a permanent magnet arranged between legs of adjacent C-cores to form a tooth; and an electromagnetic winding wound around each tooth.

18. A permanent magnet flux-switching machine stator according to claim 17, wherein each leg has a constant width perpendicular to a centerline of the leg.

* * * * *